(No Model.)
I. B. CUSHING & B. A. OSGOOD.
PROCESS OF AND APPARATUS FOR PURIFYING AND MATURING LIQUORS.
No. 246,294. Patented Aug. 30, 1881.
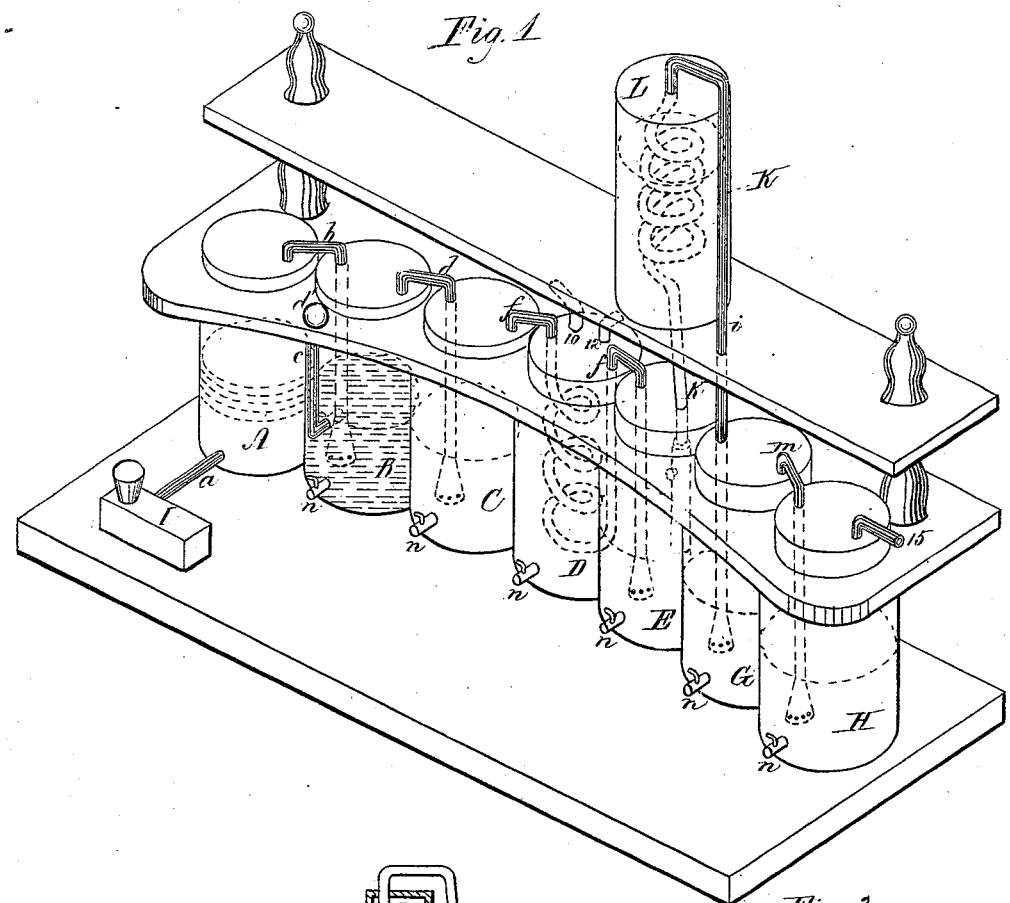
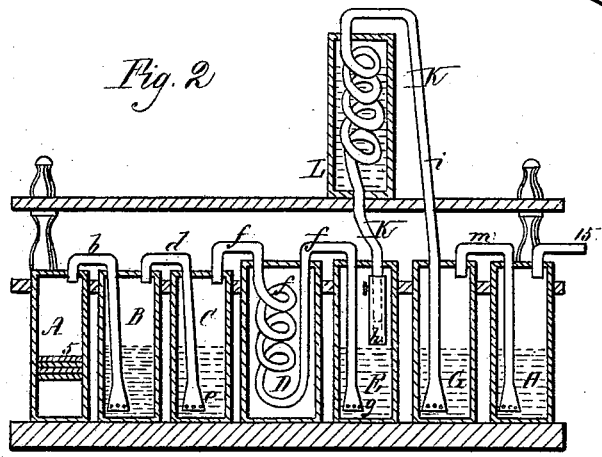
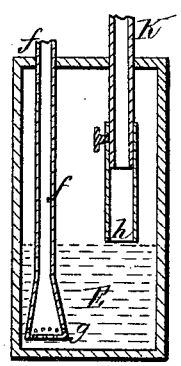

UNITED STATES PATENT OFFICE.

IRA B. CUSHING, OF BROOKLINE, AND BYRON A. OSGOOD, OF WAKEFIELD, MASSACHUSETTS, ASSIGNORS TO THE PURIFYING AND MATURING PROCESS COMPANY, OF HARTFORD, CONNECTICUT.

PROCESS OF AND APPARATUS FOR PURIFYING AND MATURING LIQUORS.

SPECIFICATION forming part of Letters Patent No. 246,294, dated August 30, 1881.

Application filed November 26, 1880. (No model.)

To all whom it may concern:

Be it known that we, IRA B. CUSHING, of Brookline, in the county of Norfolk and State of Massachusetts, and BYRON A. OSGOOD, of Wakefield, in the county of Middlesex and State aforesaid, have invented certain Improvements in Processes of and Apparatus for Purifying and Maturing Liquors, of which the following is a full, clear, and exact description, reference being had to the accompanying drawings, making part of this specification, in which—

Figure 1 is a perspective view of our improved apparatus. Fig. 2 is a longitudinal vertical section through the center of the same. Fig. 3 is a sectional detail, enlarged.

Our invention relates to certain improvements on the processes of purifying and improving the quality of distilled spirits for which Letters Patent of the United States were granted respectively to Speed and Smith, July 15, 1862, No. 35,900, and to Sullivan Sweet, Jr., January 18, 1876, No. 172,283. These processes answered well to a certain extent, but entailed the loss of a considerable percentage of the distilled spirits, for the reason that a portion was vaporized or became mixed with the air forced through it, and in that form passed through the exit-pipe into a body of water, from which it could not be recovered except by redistillation.

Our present invention has for its object to prevent this loss of a portion of the spirits, as heretofore; and it consists in extending the exit-pipe (through which the air escapes after passing through the spirits) down to a point near the level or surface of the spirits in the closed tank or retort in which it is treated, in order that the lower stratum of air contained in such retort may escape first, which allows the lighter vapor, which is charged with the ethylic alcohol, to be condensed in the upper portion of the retort, and thus saved, the lower stratum of air previously allowed to escape having taken with it the heavier alcohols and other impurities least desirable to save; and our invention also consists in certain details of construction, as hereinafter set forth and specifically claimed.

In the said drawings, A B C D E G H represent seven closed tanks or retorts, of suitable material, preferably copper, and of a size adapted to the amount of spirits to be treated. The tank A contains fibrous material 5, disposed in any suitable form, such as flannel stretched over rings closely fitting the interior of the tank, or otherwise, and through this fibrous material air is forced by a suitable air-pump, I, driven by steam or other suitable power, and provided with a conducting-pipe, a, which enters the tank A near its bottom. The air is thus purified by the fibrous material, which prevents the passage of fermenting germs, animalcules, or other impurities contained therein. The air then passes from the top of the tank A by a pipe, b, leading into and terminating near the bottom of the tank B, which contains an alkali, either in solution or in a dry state, which still further purifies the air passing up through it, eliminating the carbonic acid, and effectually destroying any animalcule or fermenting germs that may have escaped or passed through the fibrous material in the tank A. These tanks A and B may be used together, as shown, or either one may be employed without the other, if desired; but we prefer to use both, as described.

c is a supply-pipe leading to the interior of the tank B, through which the alkaline solution may be poured in, this pipe being provided with a stopper, d', closing its mouth or upper end. The air after passing through the alkali in the tank B is conducted to the bottom of the tank C, partially filled with water, by means of a pipe, d, leading from the top of the tank B, and provided at its lower end with an enlarged perforated outlet or disseminator, e. The air is by this means thoroughly washed, sweetened, and cleansed of any impurities which it may have contained, and is then forced through a pipe, f, a portion of which is disposed in the form of a coil within the tank D, (which contains no water or other liquid,) where it is heated by means of steam introduced through a pipe, 10, and escaping by a pipe, 12; or the pipe f may be heated in any other suitable manner to warm the air passing through it. The pipe $f$ then passes from the bottom of the tank D upward through its top and over into the tank E, which contains the distilled spirits to be treated, being filled from half to two-thirds full, the pipe $f$ extending down nearly to the bottom of this tank, where it is provided with a perforated enlargement or spreader, $g$, from the apertures of which the pure heated air escapes and is disseminated through the spirits or liquor, which is thus agitated and brought into contact therewith as required, the process or method of treatment up to this point, with the exception of the passing of the air through the fibrous material and alkali in the tanks A and B, being substantially the same as described in the aforesaid patents of Speed and Smith and Sullivan Sweet, Jr.

K is an eduction-pipe leading from the top of the tank E to the tank G, and extending down within the tank E to a point near the level or surface of the spirits contained therein, which may be heated, if desired, by means of a steam-jacket applied to the bottom of the tank or otherwise. The air forced through the spirits mixed with the alcoholic vapors rising therefrom ascends and fills that portion of the tank E above the surface of the liquid, the lighter portions of the air and vapors which contain the ethylic alcohol rising to the highest point, while the lower stratum, which contains the heavier alcohols, volatile oils, and other impurities, is allowed to escape first through the inlet-end $h$ of the pipe K contiguous thereto, thus allowing time for the lighter vapors containing the valuable constituents of alcohol to be condensed and saved, which can be accomplished by any suitable means in the upper part of the tank E, the alcohol thus condensed in the upper portion of the tank E running back into and mixing with the spirits contained in the lower portion thereof.

In order to extract or eliminate from the heavier air and vapors passing off through the eduction-pipe K, all or nearly all of the ethylic alcohol still contained therein, and thus effect a still greater saving, a condenser, L, of any suitable form or construction, is connected with the pipe K, by which means all of the valuable elements are saved by the condensation of the vapors, which are thus caused to flow down from the condenser back into the tank E, the non-condensable portion thereof containing the volatile oils and other impurities passing off through the portion $i$ of the pipe K to the bottom of the tank G, partially filled with water, after passing through which it is conducted by the pipe $m$, leading from the top of the tank G to the bottom of another similar tank, H, also partially filled with water, after passing through which the air escapes into the atmosphere through a pipe, 15, after having passed through the several tanks mentioned, the spirit which is collected in these tanks G H being afterward recovered, if desired, by redistillation or other well-known processes, for use for mechanical and other purposes for which it may be adapted.

That portion of the eduction-pipe K within the tank E is made telescopic, so that its end $h$ may be raised or lowered in accordance with the amount of spirit contained in the tank, in order that it may always be near the level or surface thereof, as required. Each of the tanks or retorts is provided with a faucet, $n$, through which its liquid contents can be drawn off, when desired. By thus extending the inlet-end $h$ of the eduction-pipe K down within the tank E to near the level of the surface of the spirits contained therein, instead of merely causing it to enter the top of the tank, as heretofore, we are enabled to effect an immense saving, as the large percentage of alcohol heretofore lost can, by the employment of the above-described improvements, be almost entirely saved.

What we claim as our invention is—

1. The process of separating and saving the ethylic alcohol which combines with the air forced through the spirits in the tank or retort, the same consisting in discharging the lower and heavier strata of air or vapor through an eduction-pipe having its mouth or inlet end situated near the surface of the liquor, and simultaneously condensing the lighter strata of the vapor in the upper portion of the retort, substantially as set forth.

2. In an apparatus for purifying and maturing liquors or distilled spirits, the eduction-pipe K, having the portion within the tank or retort E made telescopic, in order that its inlet end $h$ may be adjusted in accordance with the level of the liquid in the tank, substantially as set forth.

Witness our hands this 8th day of October, A. D. 1880.

IRA B. CUSHING.
BYRON A. OSGOOD.

In presence of—
P. E. TESCHEMACHER,
W. J. CAMBRIDGE.